United States Patent
Wolterink et al.

(10) Patent No.: US 10,935,771 B2
(45) Date of Patent: Mar. 2, 2021

(54) LENS SYSTEM

(71) Applicant: Anteryon Wafer Optics B.V., Eindhoven (NL)

(72) Inventors: Edwin Maria Wolterink, Eindhoven (NL); Yelena Vladimirovna Shulepova, Eindhoven (NL)

(73) Assignee: Anteryon International B.V., Eindhoven (NL)

( * ) Notice: Subject to any disclaimer, the term of this patent is extended or adjusted under 35 U.S.C. 154(b) by 183 days.

(21) Appl. No.: 16/257,593

(22) Filed: Jan. 25, 2019

(65) Prior Publication Data

US 2019/0204565 A1 Jul. 4, 2019

Related U.S. Application Data

(63) Continuation-in-part of application No. 16/227,056, filed on Dec. 20, 2018, now abandoned.

(60) Provisional application No. 62/608,719, filed on Dec. 21, 2017.

(51) Int. Cl.
    *G02B 13/00* (2006.01)

(52) U.S. Cl.
    CPC ....... *G02B 13/0085* (2013.01); *G02B 13/006* (2013.01)

(58) Field of Classification Search
    CPC ........ G02B 13/004; G02B 9/34; G02B 13/18; G02B 13/04; G02B 13/06; G02B 13/0085; G02B 13/006
    USPC ......................................... 359/771
    See application file for complete search history.

(56) References Cited

U.S. PATENT DOCUMENTS

| | | |
|---|---|---|
| 2007/0126898 A1 | 6/2007 | Feldman et al. |
| 2008/0118241 A1 | 5/2008 | TeKolste et al. |
| 2009/0310232 A1 | 12/2009 | Kudou |
| 2011/0026855 A1 | 5/2011 | Fukuta |
| 2012/0174296 A1 | 4/2012 | Uchida |
| 2019/0204565 A1* | 7/2019 | Wolterink .......... G02B 13/0085 |

FOREIGN PATENT DOCUMENTS

| | | |
|---|---|---|
| EP | 2 113 800 A1 | 11/2009 |
| EP | 2 113 802 A1 | 11/2009 |
| EP | 2 116 882 A1 | 11/2009 |
| EP | 2 163 931 A1 | 3/2010 |
| WO | 2009048320 A1 | 4/2009 |
| WO | 2013157470 A1 | 10/2013 |
| WO | 2015080582 A1 | 6/2015 |

OTHER PUBLICATIONS

International Search Report and Written Opinion dated Apr. 11, 2109.

* cited by examiner

*Primary Examiner* — Mohammed A Hasan
(74) *Attorney, Agent, or Firm* — Wood, Phillips, Katz, Clark & Mortimer

(57) ABSTRACT

The present invention relates to an optical unit consisting of four lens groups, i.e., a first lens group, a second lens group, a third lens group and a fourth lens group, which are arranged in order from an object side toward an image side surface side, wherein at least the first, second and third lens group comprise at least two lens elements, wherein said at least two lens elements within each lens group have different optical properties, wherein no glass substrate is present in at least one of the first lens group, the second lens group and the third lens group.

24 Claims, 5 Drawing Sheets

LENS SYSTEM

CROSS-REFERENCE TO RELATED APPLICATION

This application is a continuation in part of U.S. Ser. No. 16/227,056, filed Dec. 20, 2018 and which claims priority of Provisional Ser. No. 62/608,719, filed Dec. 21, 2017, the disclosure of which is hereby incorporated by reference in its entirety.

FIELD OF THE INVENTION

The present invention relates to a lens system, more in particular to an optical unit consisting of four lens groups, i.e., a first lens group, a second lens group, a third lens group and a fourth lens group, which are arranged in order from an object side toward an image side surface side.

BACKGROUND OF THE INVENTION

Lens systems as such are known and widely used in, inter alia, mobile phones, tablets and compact cameras. The picture quality (resolution) of current cameras used in those handheld devices is relative poor, especially in the corners of images. Although the lens designs used in abovementioned cameras show that very high corner resolution should be possible to achieve in the nominal case, the actual measured resolution is usually significantly lower than the nominal design.

US 2011/124373 relates to an image pickup lens comprising four or more lens blocks, wherein each of the lens blocks is an optical element comprising a lens substrate being a parallel flat plate, and a lens portion or lens portions having positive or negative power and formed on at least one of an object-side surface and image-side surface of the lens substrate, the lens substrate is different in material from the lens portion or lens portions in each of the lens blocks, the lens blocks include, in order from an object side, a first lens block, a second lens block, a third lens block, and a fourth lens block, the first lens block has positive power, the second lens block has negative power, a lens block arranged at a closest position to an image side has a concave shape facing the image side in a paraxial region. All of the lens substrates are parallel flat plates having a same thickness and each of the lens substrates is formed of a glass material.

WO 2013/157470 relates to a microscope objective lens wherein the maximum inclination (CRA) of a principal ray between a microscope objective lens and an imaging lens satisfies a conditional expression.

US 2012/081595 relates to an image taking optical system comprising, in order from the object side: a first lens having a biconvex shape and having a positive refractive power; a second lens having a meniscus shape with a concave surface facing the object side and having a negative refractive power; a third lens having a negative refractive power; a fourth lens having a meniscus shape with a concave surface facing the object side and having a positive refractive power; and a fifth lens having a negative refractive power, wherein the first lens and the second lens are cemented together.

EP 2 113 800 relates to an image pickup lens, where a lens group is assumed to comprise a lens substrate being a parallel flat plate and a lens or lenses formed on at least one of an object side surface and image side surface of the lens substrate, the image pickup lens comprising: the lens group in which lenses are formed on both sides of the lens substrate.

EP 2 116 882 relates to an imaging lens comprising: at least one lens block including a lens substrate that is a plane-parallel plate, and a lens contiguous with at least one of object-side and image-side substrate surfaces of the lens substrate, the lens exerting a positive or negative optical power; and an aperture stop restricting light amount, wherein the lens included in the lens block is formed of a material different from a material of which the lens substrate is formed; wherein the lens block comprises a first lens block disposed at a most object-side position, the first lens block exerting a positive optical power, and wherein the lens block comprises at least one lens block in which the lens is contiguous only with one of the object-side and image-side substrate surface of the lens substrate, wherein the lens substrate is formed of glass and the lens is formed of resin.

EP 2 113 802 relates to an imaging lens comprising: at least one lens block including a lens substrate that is a plane-parallel plate, and a lens contiguous with at least one of object-side and image-side substrate surfaces of the lens substrate, the lens exerting a positive or negative optical power; and an aperture stop restricting light amount, wherein the lens included in the lens block is formed of a material different from a material out of which the lens substrate is formed; wherein the lens block comprises a first lens block disposed at a most object-side position, the first lens block including, as the lens substrate, a first lens substrate, and as the lens, a lens L[LS1o] contiguous with an object-side substrate surface of the first lens substrate, wherein the lens substrate is formed by cementing together two flat-plate-shaped glass pieces, and wherein the aperture stop is located at a cemented surface between the flat-plate-shaped glass pieces.

EP 2 163 931 relates to an imaging lens, comprising: a first lens having a positive refracting power and facing an object; a second lens which is provided on an image side of the first lens and has a concave shape toward an object side; and at least one lens or more provided on the image side of the second lens, wherein lenses can be generated at one time by irradiating UV light after a lens element has been formed on a glass plate.

US 2009/310232 relates to an imaging lens comprising: a first lens group that includes sequentially from an object side, a first lens formed of resin and having a positive refractive power and a second lens formed of resin and having a negative refractive power, the first lens and the second lens collectively forming a cemented lens having a positive refractive power; a second lens group that includes a negative lens; a third lens group that includes a positive lens, wherein the first lens group, the second lens group, and the third lens groups are sequentially arranged from the object side.

US 2008/118241 relates to a camera system, comprising an optics stack including two substrates secured together in a vertical direction and an optical system on the two substrates, the two substrates having exposed sides; a detector on a detector substrate, and a stray light blocker directly on at least some sides of the optics stack.

The present inventors found that, on a large degree, this resolution degradation is caused by production tolerances in lens manufacturing resulting in decenter deviations up to 5 micrometers, and by tilt of the lens caused by the autofocus system. In addition, it is possible to make a design that is more robust to tolerances. So given production tolerances, by making a more robust design, production tolerances such as decenter will have a limited effect on resolution degradation.

One possible solution is that in current plastic molding lens technology, a more robust design would be possible by relocation the diaphragm from the front towards the middle of the lens system. However, this would result in very thin lenses (<200-300 um), which cannot be manufactured by injection molding. Another disadvantage of relocation of the diaphragm is that the nominal design performance gets lower.

Nowadays the trends in cameras for hand-held devices can be identified as follows: higher resolution, higher Mpix count, smaller pixels, lower z-height and higher field of views (from 55 deg to 70 deg).

The consequences of these trends are: optics in cameras require changes in designing the optics for the cameras: low F# and more lens elements are needed, low F# and more lens elements require tighter production tolerances. Lens systems will show an increased sensitivity to manufacturing tolerances such as lens decenter, lens shape deviations and lens tilt. This will be visible in—for example—a low corner resolution, and/or non-uniformity of the resolution in the pictures taken with these cameras. In addition lens performance is highly determined by manufacturing tolerances. The main production tolerances that lead to lower image quality and/or non-uniformity are lens decenter and lens tilt. Typical manufacturing tolerances for injection molding for decenter are typically 3-5 microns. In order to keep the performance degradation to an acceptable low level, typical maximum decenter of 1 micron would be required, which is beyond current manufacturing capability.

SUMMARY OF THE INVENTION

An object of the present invention is thus to develop lens designs that are more robust to tolerances.

Another object of the present invention is to develop such robust lens designs while maintaining nominal performance.

Another object of the present invention is to provide high performing lens designs showing high level of chromatic properties of the lens, allowing new ways of choosing the lens configuration.

The present invention relates thus to an optical unit consisting of four lens groups, i.e., a first lens group, a second lens group, a third lens group and a fourth lens group, which are arranged in order from an object side toward an image side surface side, wherein at least the first, second and third lens group comprise at least two lens elements, wherein said at least two lens elements within each lens group have different optical properties, wherein no glass substrate is present in at least one of the first lens group, the second lens group and the third lens group.

The present lens system can be identified as a wafer level optics bimaterial lens system, wherein the present lens system consists at least of three bimaterial lens groups, each lens group being an assembly of at least two contiguous lens elements comprising at least two different lens materials having different optical properties.

The present term "bimaterial lenses" refers to the use of two different materials in one lens, e.g. a lens element X made of material Q and a lens element Z made of material P, wherein both lens element X and lens element Y form together a lens. The present lenses are preferably groups of contiguous lens elements cemented together by replication technology according to WO 2009048320 A1 and in preferred embodiments they contain additional integrated intermediate substrates, filters and diaphragms. Injection molded type lenses can be used as well. The contents of WO 2009048320 are considered to be incorporated here in its entirety.

According to an embodiment the second and third lens group can be constructed as being a single lens or as a group of at least two contiguous lens elements. In an embodiment a lens group may comprise one or more substrates. According to another embodiment the second and third lens group may have been manufactured on basis of injection moulding technology. According to yet another embodiment the second and third lens group are made of glass.

According to an embodiment within one or more of the first lens group, the second lens group and the third lens group at least two lens elements of the same lens group are in contact with each other, wherein no glass substrate is present between said at least two lens elements. This means that within such a lens group there are sets of contiguous lens elements cemented together.

The present inventors are of the opinion that better chromatic properties provide better performance with less lens groups. The present lens system also provide ultra-thin lens elements (down to 50 micron, preferably 70-80 microns at the edges) that consist of two or more different materials.

According to an embodiment of the present lens system the lens elements have been manufactured according replication technology.

According to an embodiment of the present lens system no glass substrate is present in the second lens group and/or the third lens group.

According to another embodiment of the present lens system no glass substrate is present in the first lens group.

According to another embodiment of the present lens system the fourth lens group comprises one lens element.

According to another embodiment of the present lens system the fourth lens group is positioned onto an image sensor.

According to another embodiment of the present lens system the fourth lens group is of a field corrector lens type.

In a preferred embodiment of the present optical unit the fourth lens group comprises at least two lens elements, wherein the at least two lens elements within said fourth lens group have different optical properties. In addition, in such an embodiment no glass substrate is present in the fourth lens group.

According to another preferred embodiment of the present lens system the thickness of at least one lens element within the first, second and third lens group is above about 30 micron and below about 1000 micron, preferably above about 50 micron and below about 300 micron, wherein the thickness is determined by the shortest path of the light rays through a lens group. A range of about 30 micron-1000 micron is beneficial for the FOV (field of view).

In the discussion below, especially for the second embodiment of the present optical unit, i.e., the embodiment wherein the fourth lens group is based on two lens elements, the first lens group comprises Lens element L1 corresponding to Lens element (105A) and Lens element L2 corresponding to Lens element (105B), the second lens group comprises Lens element L3 corresponding to Lens element (106C) and Lens element L4 corresponding to Lens element (106D), the third lens group comprises Lens element L5 corresponding to Lens element (107E) and Lens element L6 corresponding to Lens element (107F), the fourth lens group comprises Lens element L7 corresponding to Lens element (108G) and Lens element L8. In the light of the present description the above mentioned identifications of the lens elements, for example Lens element L1 corresponds to Lens element (105A), Lens element L2 corresponds to Lens element (105B), can be used throughout the complete documents. However, in terms of legibility the lens elements have been identified through the use of numbers.

For an optimum optical performance it is preferred that in the present lens system the range of index (n) and Abbe properties in the first lens group are:

Lens element A (105A): $1.5<n<1.8$, $40<Abbe<80$
Lens element B (105B): $1.4<n<1.8$, $20<Abbe<50$, preferably $20<Abbe<40$, wherein the term "A" refers to a lens element toward an object side and term "B" refers to a lens element towards an image surface side. A range of $20<Abbe<50$ is beneficial for the FOV (field of view).

The specific location of the first, second, third and fourth lens groups and the lens elements present therein will be elucidated when discussing the figures.

In addition, It is preferred that in the present lens system the range of index (n) and Abbe properties in the second lens group are:

Lens element C (106C): $1.4<n<1.8$, $20<Abbe<50$, preferably $20<Abbe<40$,
Lens element D (106D): $1.5<n<1.8$, $40<Abbe<80$, wherein the term "C" refers to a lens element toward an object side and term "D" refers to a lens element towards an image surface side. A range of $20<Abbe<50$ is beneficial for the FOV (field of view).

In addition, It is preferred that in the present lens system the range of index (n) and Abbe properties in the third lens group are:

Lens element E (107E): $1.5<n<t8$, $30<Abbe<80$, preferably $40<Abbe<80$,
Lens element F (107F): $1.5<n<1.8$, $30<Abbe<80$, preferably $40<Abbe<80$, wherein the term "E" here refers to a lens element toward an object side and term "F" refers to a lens element towards an image surface side. A range of $30<Abbe<80$ is beneficial for the FOV (field of view).

Moreover, It is preferred that in the present lens system the range of index (n) and Abbe properties in the fourth lens group are:

Lens element G (108G): $1.5<n<1.8$, $30<Abbe<80$, preferably $40<Abbe<80$,
Lens L8: $1.5<n<1.8$, $30<Abbe<80$,
wherein the term "G" here refers to a lens element toward an object side and term "L8" refers to a lens element towards an image surface side. As discussed in this description, in a first embodiment of the present optical unit the fourth lens group comprises only Lens element G (108G). In a second embodiment of the present optical unit the fourth lens group comprises two lens elements, i.e., Lens L7 and Lens L8. In the second embodiment of the present optical unit it is preferred that no glass substrate is present between Lens L7 and Lens L8.

In addition, It is preferred that in the present lens system the range of index (n) and Abbe properties in the first lens group are according to the next equation:

$n$(lens element $B$(105$B$)minus lens element $A$(105$A$))=$0.02<$delta$<0.2$, preferably $0.05<$delta$<0.2$, Abbe (lens element A (105A) minus lens element B(105B))=$10<$delta$<40$, preferably $15<$delta$<40$, wherein the term "A" refers to a lens element toward an object side and term "B" refers to a lens element towards an image surface side. A range of $10<$delta$<40$ is beneficial for the FOV (field of view). A range of $0.02<$delta$<0.2$ is beneficial for the FOV (field of view).

In addition, It is preferred that in the present lens system the range of index (n) and Abbe properties in the second lens group are according to the next equation:

$n$(lens element $D$(106$D$)minus lens element $C$(106$C$))=$0.01</$delta$/<0.3$ Abbe (lens element C (106C) minus lens element D (106D))=$10</$delta$/<40$, wherein the term "C" refers to a lens element toward an object side and term "0" refers to a lens element towards an image surface side.

The indication "/delta/" as used here means (absolute delta).

In addition, It is preferred that in the present lens system the range of index (n) and Abbe properties in the third lens group are according to the next equation:

$n$(lens element $F$(107$F$)minus lens element $E$(107$E$))=$0</$delta$/<0.3$

Abbe (lens element E (107E) minus lens element F (107F)) $0</$delta$/<40$, wherein the term "E" here refers to a lens element toward an object side and term "F" refers to a lens element towards an image surface side.

According to a preferred embodiment of the lens system one or more additional layers are present in one or more of said four lenses groups, wherein the additional layers are chosen from the group of integrated intermediate substrates, IR filters, UV filters, apertures and diaphragms, or combinations thereof.

In an embodiment a diaphragm is positioned in the first lens group, especially positioned between lens element (105A) and lens element (105B). In another embodiment a diaphragm is positioned in the second lens group, especially positioned between lens element (106C) and lens element (106D).

The materials of said lens elements are preferably chosen from the group of UV curable polymers, preferably epoxy, acrylic and nylon type polymers.

The present invention relates furthermore to a stack of a lens assembly, wherein said stack comprises the present lens system.

In such a stack the individual four lenses are preferably stacked by using spacers and/or adhesives.

The present stack further comprises one or more of an image sensor, a sensor cover plate and a cover plate.

The present inventors found that the optical performance is to a large extent determined by the material combinations in Lens group 1 (see FIG. 1). Lens group 1 comprises material A in layer 105A and material B in layer 105B, The other layers 106C, 106D, 107E, 107F, and 108G may have any combination of (different) material types as indicated in the range of material properties below. Diaphragm is preferably between surfaces 105A and 105B but in other embodiments other positions, such as one or more of 106C and 106D, 107E and 107F, 108G and the image sensor and between L7 and L8, are also possible.

Preferred embodiments of the present invention have been formulated in the dependent claims.

BRIEF DESCRIPTION OF THE DRAWINGS

The present invention will be explained by using the Figures and embodiments.

DETAILED DESCRIPTION OF THE PREFERRED EMBODIMENT

Figure 1:
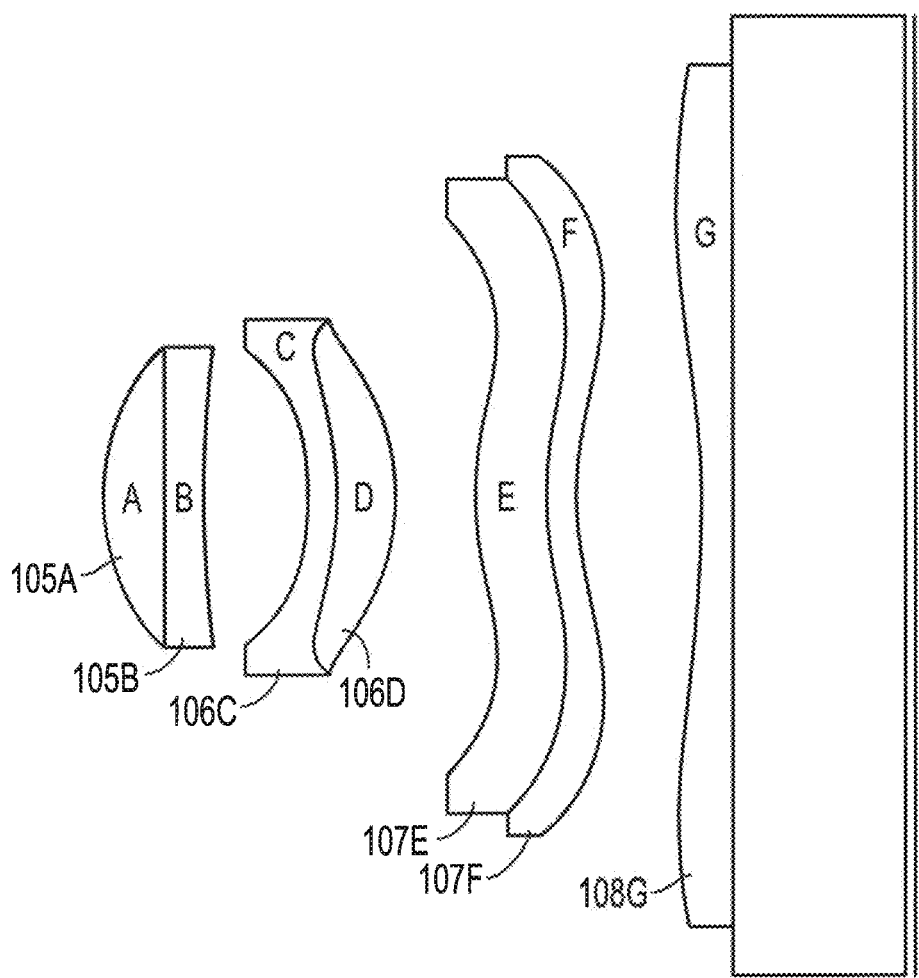
FIG. 1 shows an embodiment of a lens system comprising four lenses groups according to the present invention.

FIG. 1 shows an embodiment of a lens system comprising four lenses groups according to the present invention. The first lens group comprises lens elements A and B, the second lens group comprises lens elements C and D, lens group three comprises lens elements E and F, and lens group four comprises lens element G, the lens groups are arranged in order from an object side toward an image side surface side. The lens system according to FIG. 1 also comprises an image sensor. In the present bi-material lens system one or more integrated intermediate substrates, IR filters, UV filters, apertures and diaphragms, or combinations thereof have not been shown.

Lens group 1, i.e., the first lens group, comprises Lens element (105A) and Lens element (105B). Lens group 2, i.e., the second lens group, comprises Lens element (106C) and Lens element (106D). Lens group 3, i.e., the third lens group, comprises Lens element (107E) and Lens element (107F). Lens group 4, i.e., the fourth lens group, comprises Lens element (108G). As recited in the appended claims, there exist preferred optical properties for the materials applied in each of the lenses groups 1, 2, 3 and 4. The optical properties within one lens are not same, this means that for example the optical properties for Lens element (105A) differ from the one used for Lens element (105B), The same applies for Lens element (106C) and Lens element (106D), and for Lens element (107E) and Lens element (107F).

Figure 2:
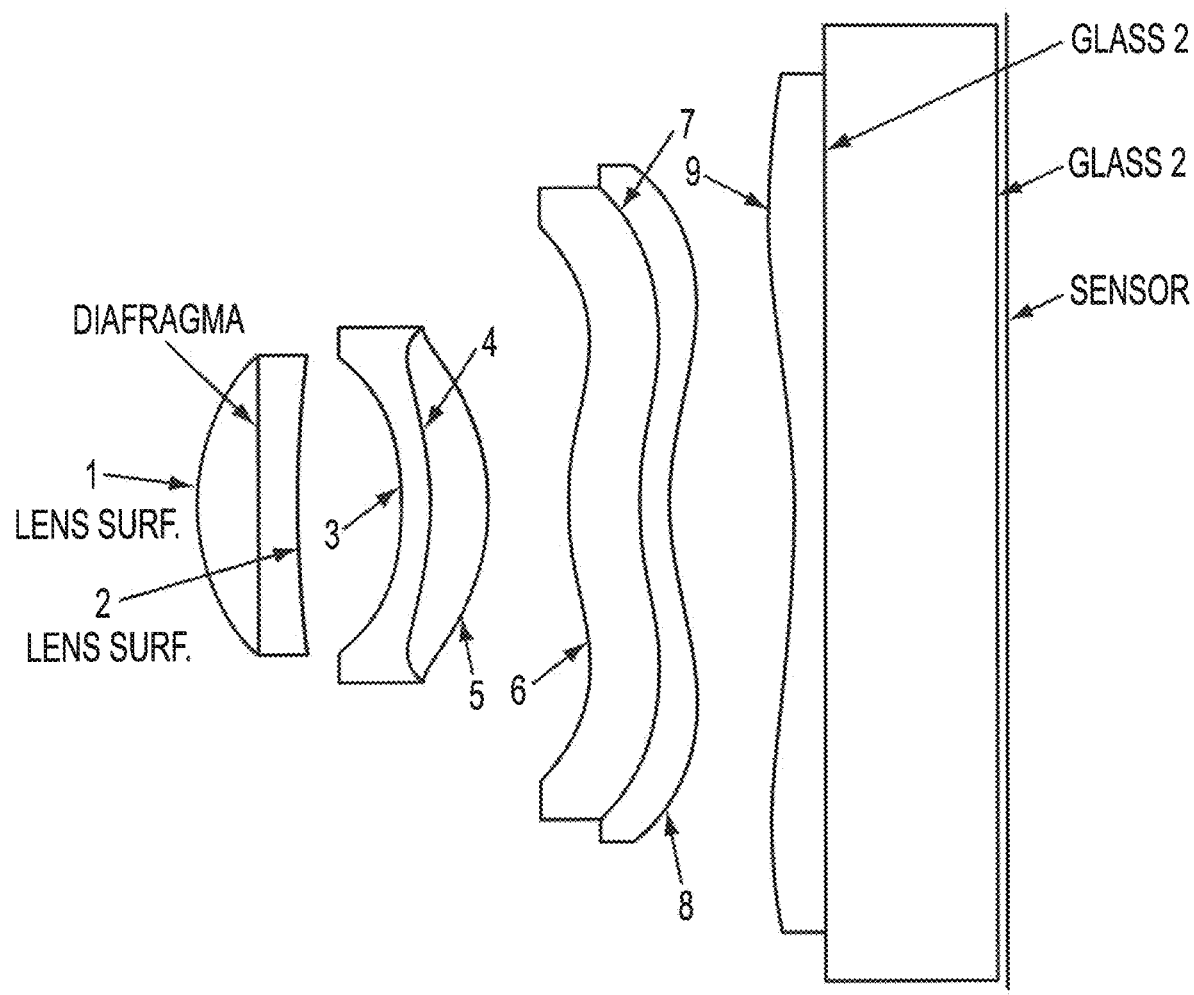
FIG. 2 shows an embodiment of a more detailed lens system comprising four lenses groups according to the present invention.

FIG. 2 shows an embodiment of a more detailed lens system comprising four lenses groups according to the present invention. Lens surface 1 and 2 are located on the first lens group. Within the first lens group a diaphragm is positioned. Lens surface 3, 4, and 5 are located on the second lens group. Lens surface 6, 7, and 8 are located on the third lens group. Lens surface 9 of the fourth lens group is located on a sensor, the sensor further comprising glass 1 and glass 2.

Figure 3:
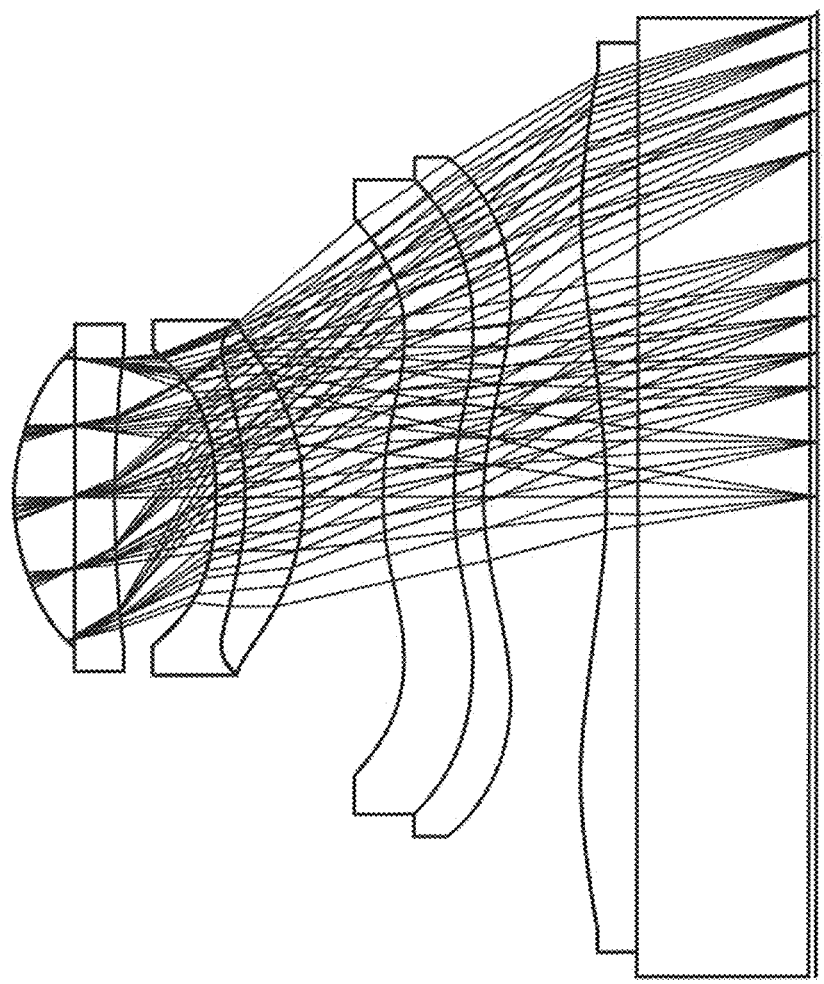
FIG. 3 shows a ray tracing model for the present lens system.

FIG. 3 shows a ray tracing model for the present lens system shown in both present FIGS. 1 and 2. The present lens system is characterized by high nominal performance, high performance after tolerances.

The present lenses are groups of contiguous lens elements cemented together by replication technology, for example manufactured according to WO2009048320A1. The contents of WO2009048320 are considered to be incorporated here in its entirety.

The experimental data below clearly demonstrate that a better quality is obtained over a wider angle field and this with a lower height. This means in practice a high performance in combination with a low z-height.

Optical Table for Embodiment (According to the Invention):

|  | Radius | Thickness | Glass | Diameter | Conic |
|---|---|---|---|---|---|
| Lens surface 1 | 0.4219373 | 0.1 | n = 1.516 Abbe 54.3 | 0.52 | 0.3831735 |
| Diafragma | Infinity | 0 | n = 1.516 Abbe 54.3 | 0.49 | 0 |
| Lens surface 2 | Infinity | 0.07 | n = 1.6 Abbe 30.7 | 0.6 | 0 |
| Lens surface 3 | 1.743488 | 0.1798829 |  | 0.5 | −55.45222 |
| Lens surface 4 | −0.4719647 | 0.05 | n = 1.6 Abbe 30.7 | 0.52 | 0 |
| Lens surface 5 | −0.7833707 | 0.1 | n = 1.516 Abbe 54.3 | 0.62 | 0 |
| Lens surface 6 | −0.5405813 | 0.1439739 |  | 0.62 | −1.719937 |
| Lens surface 7 | 0.545844 | 0.12 | n = 1.56 Abbe 37.9 | 1 | 0 |
| Lens surface 8 | 0.5584529 | 0.05 | n = 1.516 Abbe 54.3 | 1.1 | 0 |
| Lens surface 9 | 0.6169442 | 0.218136 |  | 1.18 | 0 |
| Lens surface 10 | −1.623779 | 0.05 | n = 1.516 Abbe 54.3 | 1.6 | 0 |
| Glass surface1 |  | 0.3 | BK7 | 1.517782 | 0 |
| Glass surface2 |  | 0.01 |  | 1.68405 | 0 |
| Sensor |  |  |  | 1.695045 |  |
| Total track 1.392 mm |  |  |  |  |  |

Surface Data Detail:

|  | Coeff on $r^2$ | Coeff on $r^4$ | Coeff on $r^6$ | Coeff on $r^8$ |
|---|---|---|---|---|
| Lens surface 1 | 0 | −0.3892692 | 15.395931 | −390.0683 |
| Diafragma |  |  |  |  |
| Lens surface 2 |  |  |  |  |
| Lens surface 3 | 0 | 1.0428841 | 30.173135 | −1663.9279 |
| Lens surface 4 | 0 | −8.8779129 | 129.90189 | −2963.6518 |
| Lens surface 5 | 0 | −24.539094 | 591.20171 | −787.89406 |
| Lens surface 6 | 0 | −4.9197213 | 32.673301 | 684.6925 |
| Lens surface 7 | 0 | −8.6886773 | 35.824525 | −345.84603 |

-continued

| | | | | |
|---|---|---|---|---|
| Lens surface 8 | 0 | −9.0677012 | 18.890058 | 64.651828 |
| Lens surface 9 | 0 | −3.983211 | −4.5895521 | 55.720294 |
| Lens surface 10 | 0 | 0.64598322 | −0.000927997 | −0.38196253 |

| | Coeff on r^10 | Coeff on r^12 | Coeff on r^14 | Coeff on r^16 |
|---|---|---|---|---|
| Lens surface 1 | 4840.6759 | −46974.819 | 612901.85 | −6367406.4 |
| Diafragma | | | | |
| Lens surface 2 | | | | |
| Lens surface 3 | 29428.875 | −232873.55 | 0 | |
| Lens surface 4 | 41128.737 | −269066.3 | 0 | 0 |
| Lens surface 5 | −68077.803 | 478683.78 | 0 | 0 |
| Lens surface 6 | −14049.015 | 120593.02 | 0 | 0 |
| Lens surface 7 | 2420.5699 | −8162.3106 | 3165.8517 | 25892.489 |
| Lens surface 8 | −430.36486 | 423.67683 | 0 | 0 |
| Lens surface 9 | −180.17737 | 88.548438 | 505.23706 | −884.48397 |
| Lens surface 10 | 0 | 0 | 0 | 0 |

Figure 4:
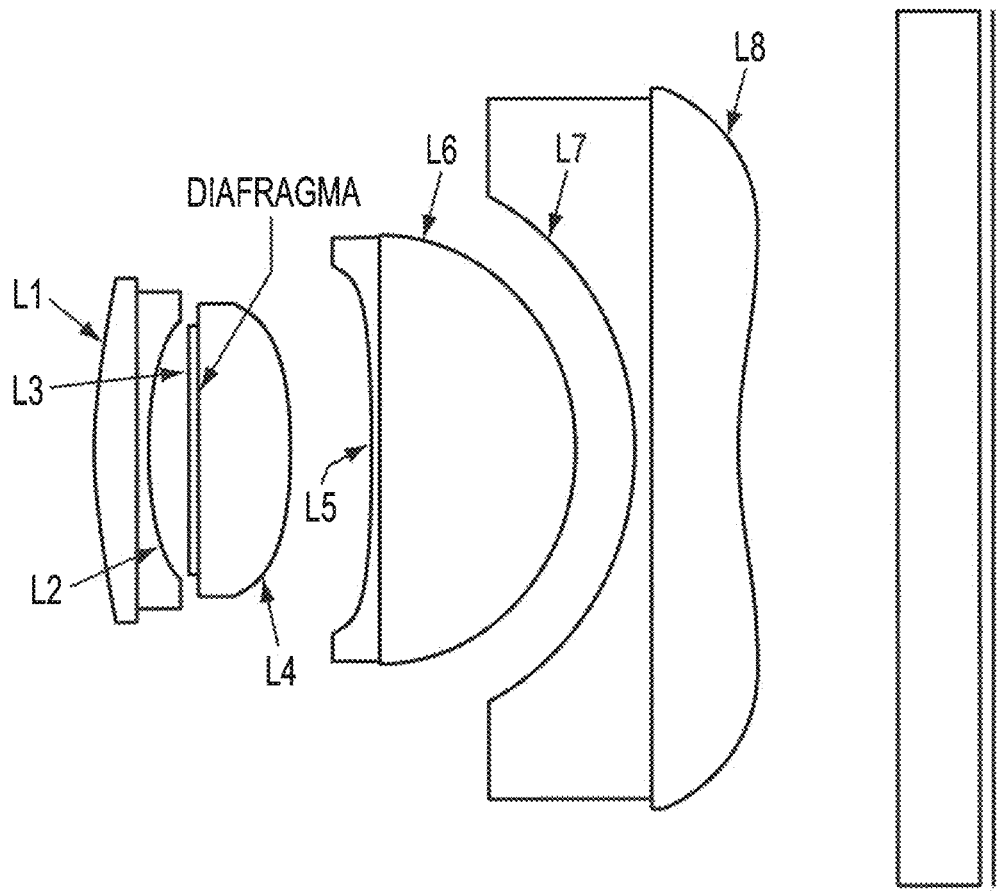
FIG. 4 shows another embodiment of a lens system comprising four lenses groups according to the present invention.

FIG. 4 shows another embodiment of a lens system comprising four lenses groups according to the present invention. The first lens group comprises lens elements L1 and L2, the second lens group comprises lens elements L3 and L4, lens group three comprises lens elements L5 and L6, and lens group four comprises lens element L7 and L8, the lens groups are arranged in order from an object side toward an image side surface side. FIG. 4 also shows an image sensor adjacent to lens group four. As shown in the lens system according to FIG. 4 a diaphragm is located in second lens group, i.e., between lens elements L3 and L4. However, in the present bi-material lens system one or more integrated intermediate substrates, IR filters, UV filters, apertures and diaphragms, or combinations thereof have not been shown. It is preferred that no glass substrate is present in any of the fourth lens groups.

As shown in FIG. 4, lens group 1, i.e., the first lens group, comprises Lens element L1 corresponding to Lens element (105A) and Lens element L2 corresponding to Lens element (105B). Lens group 2, i.e., the second lens group, comprises Lens element L3 corresponding to Lens element (106C) and Lens element L4 corresponding to Lens element (106D). Lens group 3, i.e., the third lens group, comprises Lens element L5 corresponding to Lens element (107E) and Lens element L6 corresponding to Lens element (107F). Lens group 4, i.e., the fourth lens group, comprises Lens element L7 corresponding to Lens element (108G) and Lens element L8. As recited in the appended claims, there exist preferred optical properties for the materials applied in each of the lenses groups 1, 2, 3 and 4. The optical properties within one lens group are not same, this means that for example the optical properties for Lens element L1 differ from the one used for Lens element L2. The same applies for example for Lens element L3 and Lens element L4, Lens element L5 and Lens element L6, and Lens element L7 and Lens element L8.

Figure 5:
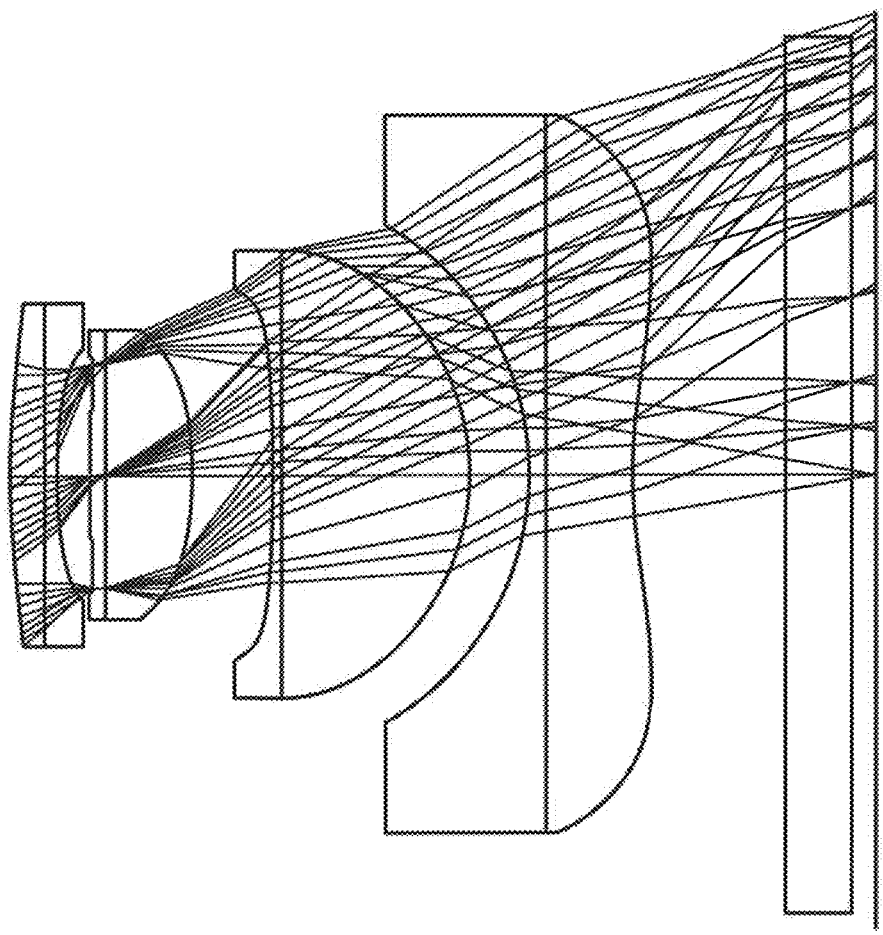
FIG. 5 shows a ray tracing model for the lens system shown in FIG. 4.

FIG. 5 shows a ray tracing model for the present lens system shown in present FIG. 4. The present lens system is characterized by high nominal performance, high performance after tolerances.

The present lenses are groups of contiguous lens elements cemented together by replication technology, for example manufactured according to WO2009048320A1. The contents of WO2009048320 are considered to be incorporated here in its entirety.

The experimental data below clearly demonstrate that a better quality is obtained over a wider angle field and this with a lower height. This means in practice a high performance in combination with a low z-height.

Optical Table for Embodiment (According to the Invention):

| | Radius | Thickness | Glass | Diameter | Conic |
|---|---|---|---|---|---|
| Lens surface 1 | 4.020802 | 0.1527935 | n = 1.52 Abbe 53.7 | 1.603557 | −50.00023 |
| Flat surface | Infinity | 0.05 | n = 1.6 Abbe 30.7 | 0.49 | 0 |
| Lens surface 2 | 1.734465 | 0.1643515 | | 1.182931 | −0.4771593 |
| Lens surface 3 | 4.111666 | 0.07114544 | n = 1.54 Abbe 41.7 | 0.07114544 | −78.41879 |
| Diafragm | Infinity | 0.4001911 | n = 1.52 Abbe 53.7 | 1.067548 | 0 |
| Lens surface 4 | −1.583276 | 0.3702229 | | 1.312943 | 4.526805 |
| Lens surface 5 | −505.8723 | 0.03719415 | n = 1.6 Abbe 30.7 | 1.717269 | 67.21689 |
| Flat surface | Infinity | 0.8807069 | n = 1.52 Abbe 53.7 | 2.025935 | 0 |
| Lens surface 6 | −0.709703 | 0.2717466 | | 2.073501 | −1 |
| Lens surface 7 | −1.031661 | 0.0685196 | n = 1.6 Abbe 30.7 | 2.269736 | −1 |
| Flat surface | Infinity | 0.3970069 | n = 1.52 Abbe 53.7 | 3.236975 | 0 |

-continued

|  | Radius | Thickness | Glass | Diameter | Conic |
|---|---|---|---|---|---|
| Lens surface 8 | 1.954871 | 0.7108793 |  | 3.339596 | 0 |
| Glass surface1 | Infinity | 0.3 | BK7 | 4.2 | 0 |
| Glass surface2 | Infinity | 0.1 |  | 4.2 | 0 |
| Sensor |  |  |  |  |  |
| total track 3.97476 mm |  |  |  |  |  |

Surface Data Detail:

|  | Coeff on $r^2$ | Coeff on $r^4$ | Coeff on $r^6$ | Coeff on $r^8$ |
|---|---|---|---|---|
| Lens surface 1 | 0 | 0 | 0 | 0 |
| Flat surface |  | 0 | 0 | 0 |
| Lens surface 2 |  | 0.10031 | −0.341097 | 10.438086 |
| Lens surface 3 | 0 | −0.015719 | 0.011997 | −1.962686 |
| Diaphragm |  |  |  |  |
| Lens surface 4 | 0 | −0.056848 | −0.442429 | 0.188804 |
| Lens surface 5 | 0 | −0.191205 | 0.21516 | −1.112377 |
| Flat surface |  |  |  |  |
| Lens surface 6 | 0 | 0.463094 | −1.129396 | 1.598089 |
| Lens surface 7 | 0 | 0.488743 | −1.57473 | 2.409484 |
| Flat surface | 0 | 0 | 0 | 0 |
| Lens surface 8 | 0 | −0.217343 | 0.014798 | 0.056981 |

|  | Coeff on $r^{10}$ | Coeff on $r^{12}$ | Coeff on $r^{14}$ | Coeff on $r^{16}$ |
|---|---|---|---|---|
| Lens surface 1 | 0 | 0 | 0 | 0 |
| Flat surface | 0 | 0 | 0 | 0 |
| Lens surface 2 | −60.829028 | 171.357416 | −187.482892 |  |
| Lens surface 3 | 1.059534 | 5.789841 | −37 |  |
| Diaphragm |  |  |  |  |
| Lens surface 4 | 6.47652 | −25.333836 | 29.166708 | 0 |
| Lens surface 5 | 1.643875 | −1.624716 | 0.585944 | 0 |
| Flat surface |  |  |  |  |
| Lens surface 6 | −1.692466 | 1.045656 | −0.327107 | 0 |
| Lens surface 7 | −2.237177 | 1.203986 | −0.287345 | 0 |
| Flat surface | 0 | 0 | 0 | 0 |
| Lens surface 8 | −0.048492 | 0.015934 | −0.002024 | 0 |

What is claimed is:

1. An optical unit consisting of four lens groups, comprising a first lens group, a second lens group, a third lens group and a fourth lens group, which said lens group are arranged in order from an object side toward an image side surface side, wherein at least the first, second and third lens group each comprise at least two lens elements, wherein said at least two lens elements within each lens group have different optical properties, wherein no glass substrate is present in at least one of the first lens group, the second lens group and the third lens group.

2. An optical unit according to claim 1, wherein within one or more of the first lens group, the second lens group and the third lens group said at least two lens elements of said lens group are in contact with each other, wherein no glass substrate is present between said at least two lens elements.

3. The lens system according to claim 1, wherein each of said lens elements has been manufactured according replication technology.

4. An optical unit according to claim 1, wherein no glass substrate is present in the second lens group and the third lens group.

5. An optical unit according to claim 1, wherein no glass substrate is present in the first lens group.

6. An optical unit according to claim 1, wherein said fourth lens group comprises one lens element.

7. An optical unit according to claim 6, wherein said fourth lens group is positioned onto an image sensor.

8. An optical unit according to claim 6, wherein said fourth lens group is of a field corrector lens type.

9. An optical unit according to claim 1, wherein said fourth lens group comprises at least two lens elements, wherein said at least two lens elements within said fourth lens group have different optical properties, wherein no glass substrate is present in said fourth lens group.

10. An optical unit according to claim 1, wherein the thickness of at least one lens element within the first, second and third and fourth lens group is above about 30 micron, preferably above about 50 micron, and below about 1000 micron, preferably below about 300 micron, wherein the thickness is determined by the shortest path of the light rays through a lens group.

11. An optical unit according to claim 1, wherein the range of index (n) and Abbe properties in the first lens group are:
Lens element A (105A, L1): 1.5<n<1.8, 40<Abbe<80,
Lens element B (105B, L2): 1.4<n<1.8, 20<Abbe<50, preferably 20<Abbe<40, wherein the term "A" refers to a lens element toward an object side and term "B" refers to a lens element towards an image surface side.

12. The optical unit according to claim 1, wherein the range of index (n) and Abbe properties in the second lens group are:
Lens element C (106C, L3): 1.4<n<1.8, 20<Abbe<50, preferably 20<Abbe<40,
Lens element D (106D, L4): 1.5<n<1.8, 40<Abbe<80, wherein the term "C" refers to a lens element toward an object side and term "D" refers to a lens element towards an image surface side.

13. The optical unit according to claim 1, wherein the range of index (n) and Abbe properties in the third lens group are:
Lens element E (107E, L5): 1.5<n<1.8, 30<Abbe<80, preferably 40<Abbe<80,
Lens element F (107F, L6): 1.5<n<1.8, 30<Abbe<80, preferably 40<Abbe<80, wherein the term "E" here refers to a lens element toward an object side and term "F" refers to a lens element towards an image surface side.

14. The optical unit according to claim 1, wherein the range of index (n) and Abbe properties in the fourth lens group are:
Lens element G (108G, L7): 1.5<n<1.8, 30<Abbe<80, preferably 40<Abbe<80,
Lens L8: 1.5<n<1.8, 30<Abbe<80,
wherein the term "G" here refers to a lens element toward an object side and term "L8" refers to a lens element towards an image surface side.

15. The optical unit according to claim 1, wherein the range of index (n) and Abbe properties in the first lens group are according to the next equation:

$n$(lens element $B$(105B,$L2$)minus lens element $A$(105A,$L1$))=0.02<delta<0.2, preferably 0.05<delta<0.2, Abbe (lens element A (105A, L1) minus lens element B(105B, L2))=10</delta<40, preferably 15</delta<40, wherein the term "A" refers to a lens element toward an object side and term "B" refers to a lens element towards an image surface side.

16. The optical unit according to claim 1, wherein the range of index (n) and Abbe properties in the second lens group are according to the next equation:

$$n(\text{lens element } D(106D, L4) \text{ minus lens element } C(106C, L3))=0.01</\text{delta}/<0.3$$

Abbe (lens element C (106C, L3) minus lens element D (106D, L4))=10</delta/<40, wherein the term "C" refers to a lens element toward an object side and term "D" refers to a lens element towards an image surface side.

17. The optical unit according to claim 1, wherein the range of index (n) and Abbe properties in the third lens group are according to the next equation:

$$n(\text{lens element } F(107F, L6) \text{ minus lens element } E(107E, L5))=0</\text{delta}/<0.3$$

Abbe (lens element E (107E, L5) minus lens element F (107F, L6))=0</delta/<40, wherein the term "E" here refers to a lens element toward an object side and term "F" refers to a lens element towards an image surface side.

18. The optical unit according to claim 1, wherein in one or more of said four lenses groups one or more additional layers are present, chosen form the group of integrated intermediate substrates, IR filters, UV filters, apertures and diaphragms, or combinations thereof.

19. The optical unit according to claim 18, wherein a diaphragm is positioned in the first lens group, especially positioned between lens element A (105A, L1) and lens element B (105B, L2), wherein the term "A" refers to a lens element toward an object side and term "B" refers to a lens element towards an image surface side.

20. The optical unit according to claim 18, wherein a diaphragm is positioned in the second lens group, especially positioned between lens element C (106C, L3) and lens element D (106D, L4), wherein the term "C" refers to a lens element toward an object side and term "D" refers to a lens element towards an image surface side.

21. The optical unit according to claim 1, wherein the materials of each of said lens elements are chosen from the group of UV curable polymers, preferably epoxy, acrylic and nylon type polymers.

22. A stack of a lens assembly, wherein said stack comprises an optical unit according to claim 1.

23. The stack according to claim 22, wherein said individual four lenses groups from said optical unit are stacked by using spacers and/or adhesives.

24. The stack according to claim 22, further comprising one or more of an image sensor, a sensor cover plate and a cover plate.

\* \* \* \* \*